(12) United States Patent
Roh et al.

(10) Patent No.: US 7,462,400 B2
(45) Date of Patent: Dec. 9, 2008

(54) ANTI-CASTER SURFACE LAMINATE

(75) Inventors: Byung-Hyun Roh, Cheongju-si (KR); Gun-Soo Chung, Cheongju-si (KR); Ill-Hong Min, Cheongju-si (KR); Seog-Goo Kang, Cheongju-si (KR); Sung-Hoon Yue, Seongnam-si (KR)

(73) Assignee: LG Chem, Ltd. (KR)

( * ) Notice: Subject to any disclaimer, the term of this patent is extended or adjusted under 35 U.S.C. 154(b) by 207 days.

(21) Appl. No.: 11/262,671

(22) Filed: Oct. 31, 2005

(65) Prior Publication Data

US 2006/0234009 A1    Oct. 19, 2006

(30) Foreign Application Priority Data

Apr. 13, 2005   (KR) ............... 20-2005-0010101 U
Jun. 22, 2005   (KR) ............... 10-2005-0053828

(51) Int. Cl.
*B32B 21/00*   (2006.01)
*B32B 21/08*   (2006.01)
*B32B 21/14*   (2006.01)
*B32B 27/36*   (2006.01)

(52) U.S. Cl. ............ 428/481; 428/480; 428/534; 428/535; 428/537.1; 428/537.7

(58) Field of Classification Search .......... None
See application file for complete search history.

(56) References Cited

U.S. PATENT DOCUMENTS

| | | | | |
|---|---|---|---|---|
| 3,660,216 A * | 5/1972 | Theodorson | ........... | 40/615 |
| 4,769,271 A * | 9/1988 | Sekimoto | ........... | 428/156 |
| 4,923,034 A * | 5/1990 | Okuzawa et al. | ........... | 181/207 |
| 5,103,614 A * | 4/1992 | Kawaguchi et al. | ........... | 52/392 |
| 5,698,061 A * | 12/1997 | Maag | ........... | 156/312 |
| 5,827,788 A * | 10/1998 | Miyakoshi | ........... | 442/164 |
| 5,879,781 A * | 3/1999 | Mehta et al. | ........... | 428/137 |
| 5,925,211 A * | 7/1999 | Rakauskas | ........... | 156/309.9 |
| 6,007,902 A * | 12/1999 | Adur et al. | ........... | 428/219 |
| 6,093,473 A * | 7/2000 | Min | ........... | 428/147 |
| 6,103,333 A * | 8/2000 | Keith | ........... | 428/99 |

(Continued)

FOREIGN PATENT DOCUMENTS

GB    2 161 434 A   *   1/1986

(Continued)

OTHER PUBLICATIONS

Whelan, Tony, Polymer Technology Dictionary (1994), pp. 174, 326-327.*

*Primary Examiner*—Vivian Chen
(74) *Attorney, Agent, or Firm*—Cantor Colburn LLP

(57) ABSTRACT

Disclosed herein are a caster-resistant surface laminate using a synthetic resin and a flooring comprising the surface laminate. The surface laminate utilizes buffering properties of a synthetic resin layer, thus minimizing damage to the surface of the flooring. The surface laminate uses a resin selected from PVC, PE, PET, PETG, PCTG and PU in order to enhance the caster resistance, impact resistance and water resistance. As a result, the surface laminate has improved physical properties without occurrence of damage, such as hollowing and breakage, caused by external impacts, as compared to conventional surface laminates. In addition, the caster-resistant surface laminate attains interior decorative effects by coloration of the synthetic resin layer.

15 Claims, 1 Drawing Sheet

U.S. PATENT DOCUMENTS

| | | | |
|---|---|---|---|
| 6,103,352 A * | 8/2000 | Takahashi | 428/195.1 |
| 6,242,005 B1 * | 6/2001 | Legrand et al. | 424/489 |
| 6,248,440 B1 * | 6/2001 | Baclez et al. | 428/336 |
| 6,333,094 B1 * | 12/2001 | Schneider et al. | 428/201 |
| 6,352,784 B1 * | 3/2002 | Katagiri | 428/511 |
| 6,497,937 B1 * | 12/2002 | Lam et al. | 428/106 |
| 6,649,245 B2 * | 11/2003 | Lenderink | 428/121 |
| 6,667,103 B1 * | 12/2003 | Mori et al. | 428/447 |
| 6,667,108 B2 | 12/2003 | Ellstrom | |
| 6,740,276 B2 * | 5/2004 | Agarwal et al. | 264/177.13 |
| 6,763,643 B1 * | 7/2004 | Mårtensson | 52/586.1 |
| 6,790,525 B2 * | 9/2004 | Takeuchi et al. | 428/339 |
| 6,803,110 B2 * | 10/2004 | Drees et al. | 428/423.7 |
| 6,852,399 B2 * | 2/2005 | Takahashi et al. | 428/213 |
| 6,908,585 B2 * | 6/2005 | Wright et al. | 264/447 |
| 7,137,229 B2 * | 11/2006 | Pervan | 52/313 |
| 2002/0031620 A1 * | 3/2002 | Yuzawa et al. | 428/1.1 |
| 2002/0136862 A1 * | 9/2002 | Dong et al. | 428/150 |
| 2002/0146954 A1 * | 10/2002 | Drees et al. | 442/290 |
| 2003/0021945 A1 * | 1/2003 | Kelch | 428/90 |

FOREIGN PATENT DOCUMENTS

| | | | |
|---|---|---|---|
| JP | 02-274533 A | * | 11/1990 |
| JP | 09-279821 A | * | 10/1997 |
| KR | 1020050053828 | | 10/2005 |
| WO | WO 2004/098881 | * | 11/2004 |
| ZA | 7403243 A | * | 1/1975 |

* cited by examiner

ANTI-CASTER SURFACE LAMINATE

This application claims the benefit of the filing dates of Korean Utility Model Application No. 20-2005-0010101 filed on Apr. 13, 2005 and Korean Patent Application No. 10-2005-0053828 filed on Jun. 22, 2005 in the Korean Intellectual Property Office, the disclosures of which are incorporated herein in their entirety by reference.

TECHNICAL FIELD

The present invention relates to a surface laminate having superior caster resistance, impact resistance and water resistance, and a flooring comprising the surface laminate. More particularly, the present invention relates to a caster-resistant natural wood flooring comprising a surface laminate and a grooved base (plywood or wood-based board) laminated to the surface laminate wherein the surface laminate includes a high-density reinforcing layer, a natural veneer layer and a synthetic resin layer laminated in this order from the bottom.

BACKGROUND ART

FIG. 1 is a cross-sectional view showing the structure of a conventional flooring for an under-floor heating system in which a natural veneer is laminated on a waterproof plywood. As shown in FIG. 1, the conventional flooring has a structure wherein a natural veneer layer 22 is surface-coated with a UV coating paint to form a general UV coating layer 21', or is resin-impregnated and then laminated over a waterproof plywood layer 10' through an adhesive layer 40.

However, disadvantages of the conventional flooring for an under-floor heating system include poor scratch resistance and impact resistance under a certain load. Specifically, the conventional flooring has a surface scratch resistance as low as 0.5~1N, which is measured by scratching the flooring using a diamond needle, and an impact resistance as low as 5 cm, which is measured by dropping a metal ball weighing 228 g onto the flooring. These low values indicate that the conventional flooring is easily impaired when household appliances are laid thereon and used. Accordingly, there is a large possibility that the conventional flooring causes consumer complaints and cannot satisfy diverse needs of consumers. There is, thus, a need for a flooring having improved scratch resistance and impact resistance.

As other conventional floorings, there have been widely known floorings which are manufactured by attaching a decorative veneer (printed paper) to plywood and coating the laminate, or laminating plywood and a medium-density fiberboard (MDF) to each other, joining a decorative veneer to the MDF and coating the laminate. Representative examples of these floorings are manufactured by attaching a decorative sheet (printed paper) to plywood, or laminating plywood and MDF to each other and attaching a decorative sheet (printed paper) to the medium-density fiberboard of the laminate.

The former floorings, however, have the problem of poor caster resistance. In addition, in the case where tongues and grooves are formed on the floorings, naps and edge splits may occur on which yams of socks and stockings are often snagged and raveled out. On the other hand, since the latter floorings have the problem that MDF is swollen by permeation of water because the MDF has poor water resistance, sometimes impairing the design of the floorings, as in the use of wood-made decorative veneer (printed paper).

Further, the use of a medium-density fiberboard having superior physical properties to plywood is advantageous in terms of caster resistance but causes problems of poor water resistance and occurrence of peeling when immersed in water.

Thus, there exists a need for the development of a wood flooring as a low-price construction material having a stabilized dimensional variation against temperature changes while satisfying required physical properties, e.g., caster resistance and water resistance.

DISCLOSURE

[Technical Problem]

Therefore, the present invention has been made in view of the above problems of the prior art, and it is one object of the present invention to provide a surface laminate with superior caster resistance, impact resistance and water resistance which comprises a reinforcing layer, a synthetic resin layer and a natural veneer layer, the layers being integrally joined so that the surface strength of the surface laminate is increased while maintaining a natural texture, and a wood flooring comprising the surface laminate.

It is another object of the present invention to provide a caster-resistant surface laminate capable of attaining interior decorative effects by coloration, and a flooring comprising the surface laminate.

[Technical Solution]

In accordance with an aspect of the present invention for achieving the above objects, there is provided a caster-resistant surface laminate composed of a wood veneer layer having a reinforcing layer and a synthetic resin layer.

The surface laminate of the present invention is characterized by the lamination of a reinforcing layer showing basic mechanical properties and buffering properties and a synthetic resin layer showing superior mechanical properties and having an elongation sufficient to absorb external impacts so that the surface laminate shows superior caster resistance and impact resistance. The reinforcing layer and the synthetic resin layer contribute to the caster resistance of the surface laminate in a ratio of about 40%:60%.

The caster-resistant surface laminate of the present invention comprises a reinforcing layer, a veneer layer and a synthetic resin layer laminated in this order from the bottom, or a reinforcing layer, a synthetic resin layer and a veneer layer laminated in this order from the bottom.

The former caster-resistant surface laminate can prevent damage to the veneer and is effective in the absorption of impacts when integrally joining the wood veneer layer by compaction using a press.

The term "caster resistance" as used herein refers to a degree of hollowing caused by wheels of a chair commonly used at home.

The caster-resistant surface laminate of the present invention is characterized by improved surface physical properties such that the surface of a flooring is protected against damage, e.g., indentation and breakage, caused by a heavy or sharp object. To this end, the synthetic resin layer is preferably made of a synthetic resin showing superior mechanical properties and having an elongation sufficient to absorb external impacts. As the synthetic resin, there can be used, for example, polyvinyl chloride (PVC), polycyclohexylene dimethylene (PC), polyethylene (PE), polypropylene (PP), polyethylene terephthalate (PET), ethylene glycol-modified PET (PETG), cyclohexane dimethanol-modified PETG (PCTG), isophthalic acid-modified PCTG (PCT-A), high-impact polystyrene (HIPS), acrylonitrile butadiene styrene copolymer (ABS), polyurethane (PU), styrene butadiene styrene block copolymer (SBS), styrene ethylene butylenes styrene block copolymer (SEBS), syndiotactic polystyrene (SPS), styrene ethylene propylene styrene block copolymer (SEPS), acrylate, etc. Of these, PVC, PETG and PCTG are preferred, and PCTG is particularly preferred.

PVC is a non-environmentally friendly material and generates toxic gases, e.g., hydrogen chloride gas (HCl), when incinerated. In contrast, since PCTG and PETG are environmentally friendly materials generating carbon dioxide ($CO_2$) and water vapor ($H_2O$) when incinerated, they are not restricted in use. In addition, PCTG and PETG have advantages in terms of superior optical properties and easy processing despite the use of reduced amounts of additives. Particularly, PCTG has superior heat resistance and impact resistance to PETG, and hence shows excellent surface physical properties, e.g., improved resistance to damage by chopping and impacts.

A preferred composition of the synthetic resin layer comprises 10~50 parts by weight of a plasticizer or ethylene vinyl acetate (EVA), and 1~5 parts by weight of a processing lubricant, and 100 parts by weight of at least one synthetic resin selected from PVC, PC, PE, PP, PET, PETG, PCTG, PCT-A, HIPS, ABS, PU, SBS, SEBS, SPS, SEPS, and acrylates. The synthetic resin layer may be composed of a single or composite layer, and may be made of one or more blended resins.

To attain interior decorative effects, colorants, such as pigments, can be added to the synthetic resin layer to impart transparent colors to the synthetic resin layer, enabling the surface laminate to have coloration effects. Further, temperature-sensitive pigments can be added to the synthetic resin layer to ensure color changes in response to temperature changes.

Colorants used to prepare colored synthetic resins are organic and inorganic dyes and pigments. Examples of organic pigments include azo and disazo pigments, laked azo and disazo pigments, polycyclic pigments, phthalocyanine phthalocyanine, quinicridone pigments, perylene pigments, dioxazine pigments, anthraquinone pigments, thioindigo pigments, diary anthraquinone pigments, and quinophthalone pigments.

Examples of inorganic pigments include dyeable metal oxides, mixed oxides, aluminum sulfate, chromate salts, metal powders, pearl pigments, phosphors, titanium oxide, iron oxide, carbon black, silicates, nickel titanate, cobalt pigments, and chromium oxide. In addition to these pigments, if needed, other pigments can be selected and used to produce appropriate colors.

In temperature-sensitive pigments, examples of color-creating components include 2,2-dibutylamino-6-methyl-7-anilinofluorane, 2,2-butylisoamyl-6-methyl-7-anilinofluorane, 3,3-dimethylamino-6-methyl-7-anilinofluorane, and the like, and examples of color developers include compounds that can be mixed with phenol-based compounds, e.g., bisphenol-A and bisphenol-S, p-hydroxybenzyl benzoic acid, p-phenyl phenol and acidic terra alba to create or remove colors by the donation-acceptance mechanism of electrons.

The temperature-sensitive colorants used in the present invention are provided for illustrative purpose only, and it should be understood that the present invention is not limited thereto in any manner. Various temperature-sensitive colorants can be used along with appropriate organic and inorganic pigments. The organic and inorganic pigments can be used in amounts not more than 5%, depending on the desired colors.

The surface laminate of the present invention is characterized in that the wood veneer layer including the reinforcing layer and the synthetic resin layer is integrally joined by compaction using a high-pressure press. In doing so, the caster resistance and impact resistance of the surface laminate according to the present invention can be simultaneously maintained.

Preferably, the caster-resistant surface laminate of the present invention further comprises a UV coating layer at its uppermost portion. It is preferred that a UV coating paint used to form the UV coating layer be solvent-free type. The use of the solvent-free UV coating paint enables prevention of sick house syndrome and provision of environmentally friendly finishing materials.

UV coating paints using solvents, such as benzene, toluene and xylene, satisfy the minimum requirements for qualification grades as environmentally friendly construction materials, whereas solvent-free UV coating paints satisfy the requirements for the highest grade. Accordingly, solvent-free UV coating paints are the most environmentally friendly type of paints.

Qualification grades for environmentally friendly construction materials are classified into the following five groups: Highest (five clovers marked), superior (four clovers marked), good (three clovers marked), average I (two clovers marked) and average II (one clover marked). The use of the highest grade materials is recommended for the maintenance of the indoor air environment at an optimal level.

The reinforcing layer used to produce the surface laminate of the present invention is selected from a veneer, a shielding paper, a high-density fiberboard (HDF), and a kraft paper. The use of the low-price reinforcing layer and resin-impregnated layer improves the caster resistance and impact resistance at low cost.

Depending on the desired thickness and price of the reinforcing layer and the synthetic resin layer, one or more low-basis weight or high-basis weight layers can be laminated.

The caster-resistant surface laminate of the present invention can be used to manufacture floorings, wall closets, ceilings and furniture, and particularly floorings.

The present invention further provides a caster-resistant flooring which comprises the caster-resistant surface laminate having the reinforcing layer and the synthetic resin layer.

The caster-resistant flooring of the present invention comprises a base, an adhesive layer and the caster-resistant surface laminate laminated in this order from the bottom.

For reducing noise transmission between floors and imparting improved soundproofing performance, the caster-resistant flooring of the present invention may further comprise at least one soundproof layer laminated in at least one position selected from (a) between the base and the caster-resistant surface laminate and (b) under the base.

The base used to manufacture the flooring of the present invention is selected from a polyvinyl chloride resin layer, HDF, MDF, a Paul strand board, and a waterproof plywood layer, and is preferably back-grooved to ensure improved dimensional stability and reduced occurrence of cracks.

DESCRIPTION OF DRAWINGS

The above and other objects, features and other advantages of the present invention will be more clearly understood from the following detailed description taken in conjunction with the accompanying drawings, in which.

BEST MODE

The present invention will now be described in more detail with reference to the following examples and accompanying drawings. However, these examples and drawings are not to be construed as limiting the scope of the invention.

Figure 1:
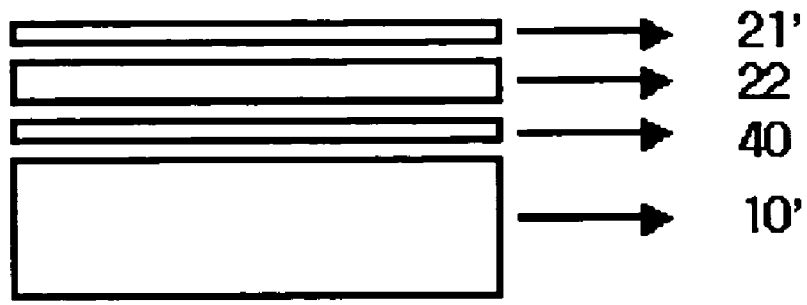
FIG. 1 is a cross-sectional view of a conventional flooring for an under-floor heating system in which a natural veneer is laminated on a waterproof plywood.

The cross section of a conventional flooring for an under-floor heating system is shown in FIG. 1. As shown in FIG. 1, the conventional flooring has a structure in which a general UV coating layer 21', a natural veneer 22, an adhesive 40 and a waterproof plywood layer 10' are laminated in this order from the top.

Figure 2:
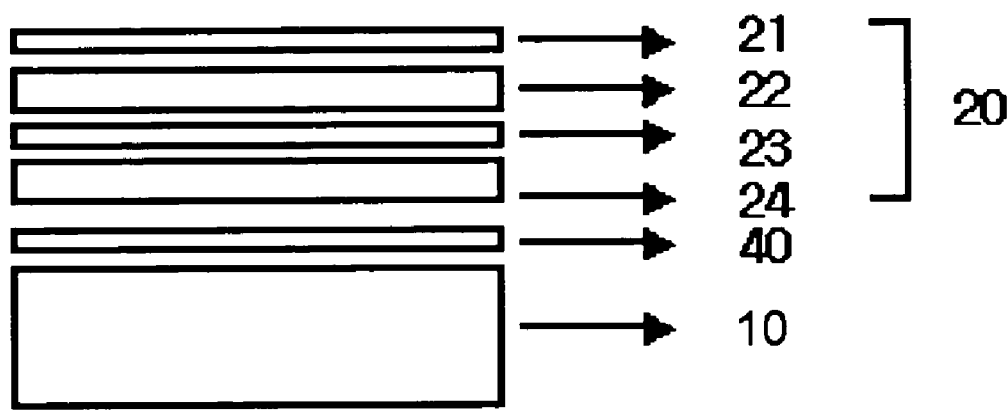
FIG. 2 is a cross-sectional view of a caster-resistant flooring according to one embodiment of the present invention in which a caster-resistant surface laminate and a back-grooved base are laminated to each other.

FIG. 2 is a cross-sectional view of a caster-resistant flooring according to one embodiment of the present invention. As shown in FIG. 2, the flooring has a structure in which a caster-resistant surface laminate 20 is laminated over a base 10 through an adhesive layer 40.

According to one preferred embodiment of the present invention, although not shown in the figure, the caster-resistant surface laminate 20 comprises a veneer (or at least one material selected from shielding paper, HDF, and kraft paper) high-density reinforcing layer 24, a natural veneer layer 22, a synthetic resin layer 23, and a solvent-free UV coating layer 21 laminated in this order from the bottom.

According to another preferred embodiment of the present invention, the caster-resistant surface laminate 20 shown in FIG. 2 comprises a veneer (or at least one material selected from shielding paper, HDF, and kraft paper) high-density reinforcing layer 24, a synthetic resin layer 23, a natural veneer layer 22, and a solvent-free UV coating layer 21 laminated in this order from the bottom.

The caster-resistant surface laminate 20 is produced by laying the high-density reinforcing layer 24, the natural veneer layer 22 and the synthetic resin layer 23 in this order from the bottom, or laying the high-density reinforcing layer 24, the synthetic resin layer 23 and the natural veneer layer 22 in this order from the bottom, pressurizing the laminate in a press under a pressure 20~200 kg/cm$^2$ while heating to a temperature 110~180° C. for 15~60 minutes, and cooling the pressurized laminate under the same pressure for 15~30 minutes.

Finally, the caster-resistant surface laminate 20 thus produced and the base 10 are adhered to each other by the adhesive layer 40.

Examples of adhesives that can be used to form the adhesive layer 40 include thermosetting melamine resins, and thermosetting or room temperature-curable urethane and epoxy resins, polyvinyl alcohol, polyvinyl acetate, and the like.

When a thermosetting melamine resin is used as the adhesive, it is applied to the base 10 in an amount of 80~300 g/m$^2$ to form the adhesive layer 40. On the other hand, when a thermosetting or room temperature-curable urethane or epoxy resin is used as the adhesive, it is applied to the base 10 in an amount of 80~250 g/m$^2$ to form the adhesive layer 40. Thereafter, the caster-resistant surface laminate 20 is laid on the adhesive layer 40. When a thermosetting melamine resin is used as the adhesive, the laminate is pressurized and cured under a pressure of 10~15 kgf/cm$^2$ for 1~5 minutes. Meanwhile, when a room temperature-curable urethane or epoxy resin is used as the adhesive, the laminate is pressed under a pressure of 10~15 kgf/cm$^2$ for one day.

Pressing of the base 10 and the caster-resistant surface laminate 20 at room temperature can minimize thermal deformation.

Figure 3:
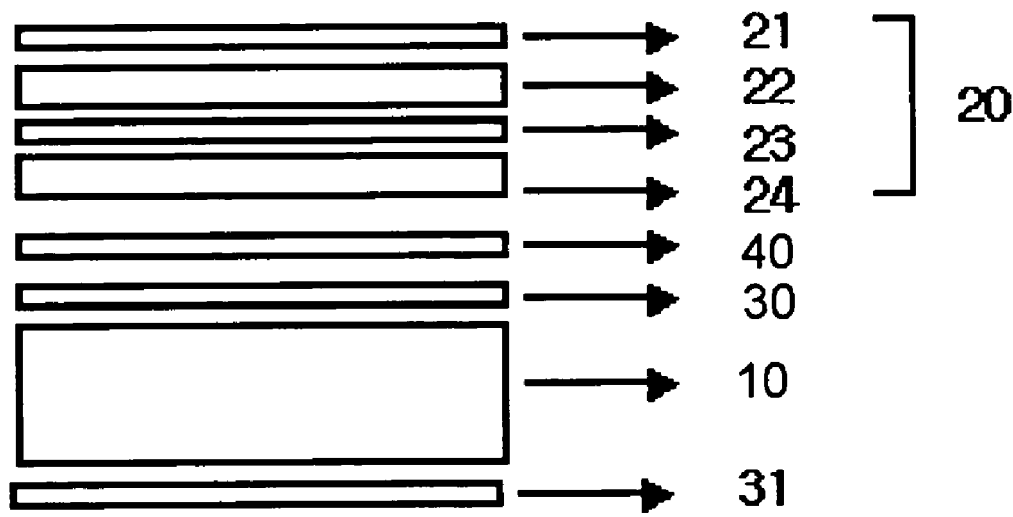
FIG. 3 is a cross-sectional view of a caster-resistant flooring according to another embodiment of the present invention in which two soundproof layers are added to the flooring shown in FIG. 2.

FIG. 3 is a cross-sectional view of a caster-resistant flooring according to another embodiment of the present invention in which two soundproof layers are added to the flooring shown in FIG. 2. As shown in FIG. 3, a first soundproof layer 30 is interposed between the base 10 and the adhesive layer 40, and a second soundproof layer 31 underlies the base 10. However, the position and number of soundproof layers are not specially limited.

As materials for the soundproof layers, there can be used, for example, polyvinyl chloride (PVC), polyethylene (PE), ethylene vinyl acetate (EVA), polypropylene (PP), polyurethane (PU), polyester non-woven fabrics, chloroprene rubber (CR), acrylonitrile butadiene rubber (NBR), and the like. In addition, the surface of the soundproof layers can be processed by an embossing and intaglio technique, a chemical crosslinking and foaming process, and a high-pressure foaming process.

EXAMPLES

1. Production of Base 10

A polyvinyl chloride resin layer having a thickness of 1.0~5.0 mm was formed of a composition comprising a PVC resin, a plasticizer, a filler, a stabilizer, and other components. The base can be formed of at least one resin selected from thermosetting resins and thermoplastic resins.

A strand board and a high-density fiberboard were produced by pressurizing a strand or a fiber obtained through cutting or fiberization of lumber in a melamine resin, followed by shaping.

A waterproof plywood layer was produced by layering 3 to 7 veneers together using a melamine resin in such a manner that the grain directions of the veneers were at right angles to one another, and pressing the laminate in a press.

2. Production of Caster-resistant Surface Laminate 20

1) Production of Solvent-free UV Coating Layer 21

UV coating for surface protection and high-quality appearance was carried out 6~10 times using a solvent-free coating paint.

2) Production of Natural Veneer Layer 22

A natural veneer layer 22 was produced by cutting natural raw lumber using a rotary lathe or slicer to a thickness of 0.12~5 mm.

3) Production of Synthetic Resin Layer 23

A synthetic resin layer 23 was produced from a composition comprising 100 parts by weight of PETG, 30 parts by weight of EVA and 3 parts by weight of a processing lubricant by a calendering process.

4) Production of High-density Reinforcing Layer 23

A veneer was produced by cutting natural raw lumber using a rotary lathe or slicer to a thickness of 0.3~8 mm. If necessary, both sides of the veneer were taped for storage in order to prevent occurrence of cracks in the grain directions upon handling. For improved dimensional stability and minimized bending of the veneer, the veneer was dried to have a water content of 10% or less.

A shielding paper was produced by impregnating a paper having a basis weight of 50~150 g/m$^2$ with a phenol or melamine resin, followed by drying and semi-curing in an oven at 80~150° C. for 0.5~3 minutes. Two or more sheets of the shielding paper can be used depending on the desired thickness.

An HDF was produced by treating a fiber obtained from a coniferous or deciduous tree with a phenol resin, followed by shaping, high-temperature pressurization and curing.

A kraft paper was produced by impregnating a paper having a basis weight of 80~300 g/m$^2$ with a melamine or phenol resin, followed by drying and semi-curing in an oven at 80~150° C. for 0.5~3 minutes. Two or more sheets of the kraft paper can be used depending on the desired thickness.

4) Integration of High-density Reinforcing Layer 24, Natural Veneer Layer 22 and Synthetic Resin Layer 23

The synthetic resin layer 23 was laid between the high-density reinforcing layer 24 and the natural veneer layer 22. Alternatively, the high-density reinforcing layer 24, the natural veneer layer 22, and the synthetic resin layer 23 were laminated in this order from the bottom. The resulting structure was pressurized in a press at increasing pressures of 20, 40, 60, 80, 100, 120 and 150 kg/cm$^2$ at 110~170° C. for 15, 20, 25 and 30 minutes, respectively, and cooled under the same pressure for 25 minutes to integrally join the layers.

3. Lamination of Base 10 and Caster-resistant Surface Laminate 20

An adhesive layer 40 was formed by applying 150 g/m$^2$ of a thermosetting melamine resin to the base 10. Alternatively, an adhesive layer 40 was formed by applying 200 g/m$^2$ of a thermosetting or room temperature-curable urethane or epoxy resin to the base. Thereafter, the caster-resistant surface laminate 20 was laid on the adhesive layer 40. When the thermosetting melamine resin was used, the laminate was pressurized and cured under a pressure of 12 kgf/cm$^2$ for 2~5 minutes. On the other hand, when the room temperature-curable resin was used, the laminate was pressurized under a pressure of 15 kgf/cm$^2$ for one day to adhere the caster-resistant surface laminate to the base.

The surface physical properties of the highly caster-resistant wood flooring (Example 1) thus manufactured according to the present invention were compared to those of the conventional flooring for an under-floor heating system shown in FIG. 1 (Comparative Example 1). The results are shown in Table 1 below.

The surface strength of the floorings was measured in accordance with the following common procedure. First, test pieces having a predetermined size were cut from the floorings. The scratch resistance was measured by scratching the surface of the test pieces using a diamond needle and was expressed in a 0.5N unit. The impact resistance was measured by dropping a weight (225 g) from increasing heights (increments of 10 cm) onto the surface of the test pieces and visually observing the presence of damage to the test pieces. The caster resistance was measured by pressing the test pieces under a load of 60 kg at a rate of 12 m/min., repeating the pressing 100 times, and observing the occurrence of hollowing or breakage visually or under an optical microscope.

TABLE 1

|  | Example 1 | Comparative Example 1 |
|---|---|---|
| Scratch resistance (N) | 3~4 | 0.5~1 |
| Impact resistance (cm) | ≧80 | 5~10 |
| Caster resistance (60 kg) | ≧100 repeats (unchanged) | ≦10 repeats (coating broken) |

As is apparent from the data shown in Table 1, the surface physical properties of the highly caster-resistant natural wood flooring according to the present invention were greatly improved, compared to those of the conventional flooring for an under-floor heating system. Specifically, the scratch resistance of the flooring according to the present invention increased to a maximum of 4N, and the impact resistance increased to a maximum of 100 cm. Further, in the caster resistance of the flooring according to the present invention, no surface hollowing was observed under a load of 60 kg even after 100 repeats. The caster resistance of the natural veneer was markedly improved sufficiently to reduce the possibility of consumer complaints to a considerable extent, and the surface physical properties of the flooring according to the present invention were drastically improved sufficiently to satisfy consumers.

INDUSTRIAL APPLICABILITY

By integration of the wood veneer layer comprising the high-density reinforcing layer and the synthetic resin layer, the flooring of the present invention shows superior caster resistance, water resistance, scratch resistance and impact resistance to conventional flooring products. Particularly, the addition of colorants and temperature-sensitive pigments to the synthetic resin layer can provide interior decorative effects.

In addition, the solvent-free UV coating treatment contributes to environmental protection. The integration of the reinforcing layer, the synthetic resin layer and the natural veneer by compaction using a high-pressure press achieves surface reinforcement. The formation of grooves on the back surface of the base improves the surface strength of the flooring of the present invention when compared to the conventional flooring for an under-floor heating system, and the addition of one or more soundproof layers can impart improved soundproofing performance to the flooring of the present invention.

The invention claimed is:

1. A caster-resistant surface laminate composed of a wood veneer layer having a reinforcing layer and a synthetic resin layer, wherein the synthetic resin layer is made of glycol-modified PET (PETG) or cyclohexane dimethanol-modified PETG (PCTG), and wherein several sheets of the reinforcing layer and synthetic resin layer are laminated depending on the desired thickness.

2. The caster-resistant surface laminate according to claim 1, wherein the wood veneer layer comprises a reinforcing layer, a veneer layer and a synthetic resin layer laminated in this order from the bottom.

3. The caster-resistant surface laminate according to claim 1, wherein the wood veneer layer comprises a reinforcing layer, a synthetic resin layer and a veneer layer laminated in this order from the bottom.

4. The caster-resistant surface laminate according to claim 1, wherein the synthetic resin layer contains a colorant.

5. The caster-resistant surface laminate according to claim 1, wherein the synthetic resin layer contains a temperature-sensitive pigment.

6. The caster-resistant surface laminate according to claim 1, wherein the wood veneer layer is integrally joined by compaction using a press.

7. The caster-resistant surface laminate according to claim 1, further comprising a UV coating layer at the uppermost portion of the surface laminate.

8. The caster-resistant surface laminate according to claim 7, wherein the UV coating layer is formed of a solvent-free UV coating paint.

9. The caster-resistant surface laminate according to claim 1, wherein the reinforcing layer is selected from a veneer, a shielding paper, a high-density fiberboard (HDF), and a kraft paper.

10. The caster-resistant surface laminate according to claim 1, wherein the surface laminate is used to manufacture floorings, wall closets, ceilings, and furniture.

11. A caster-resistant flooring comprising a caster-resistant surface laminate wherein the caster-resistant surface laminate has a reinforcing layer and a synthetic resin layer,
   wherein the synthetic resin layer is made of glycol-modified PET (PETG) or cyclohexane dimethanol-modified PETG (PCTG); and wherein several sheets of the reinforcing layer and synthetic resin layer are laminated depending on the desired thickness.

12. The caster-resistant flooring according to claim 11, wherein the flooring comprises a base, an adhesive layer, and the caster-resistant surface laminate laminated in this order from the bottom.

13. The caster-resistant flooring according to claim 12, further comprising at least one soundproof layer laminated in at least one position selected from (a) between the base and the caster-resistant surface laminate and (b) under the base.

14. The caster-resistant flooring according to claim 12, wherein the base is selected from a synthetic resin layer, a high-density fiberboard (HDF), a medium-density fiberboard (MDF), a Paul strand board, and a waterproof plywood.

15. The caster-resistant flooring according to claim 12, wherein the base is back-grooved.

* * * * *